(12) United States Patent
Salato

(10) Patent No.: US 7,940,536 B2
(45) Date of Patent: May 10, 2011

(54) FLYBACK CONVERTER WITH IMPROVED SYNCHRONOUS RECTIFICATION

(75) Inventor: Maurizio Salato, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 465 days.

(21) Appl. No.: 11/754,766

(22) Filed: May 29, 2007

(65) Prior Publication Data

US 2007/0279945 A1    Dec. 6, 2007

Related U.S. Application Data

(60) Provisional application No. 60/809,319, filed on May 30, 2006.

(51) Int. Cl.
*H02M 3/335* (2006.01)

(52) U.S. Cl. .............. 363/21.14; 363/20; 363/21.12

(58) Field of Classification Search ............ 363/20, 363/21.01–21.18, 39, 40, 115, 123, 127
See application file for complete search history.

(56) References Cited

U.S. PATENT DOCUMENTS

| | | | | |
|---|---|---|---|---|
| 5,267,133 A | * | 11/1993 | Motomura et al. | 363/21.03 |
| 5,434,768 A | * | 7/1995 | Jitaru et al. | 363/21.01 |
| 5,933,332 A | * | 8/1999 | Honma | 363/20 |
| 6,002,597 A | * | 12/1999 | Rozman | 363/21.06 |
| 6,081,432 A | * | 6/2000 | Rinne et al. | 363/16 |
| 6,674,658 B2 | * | 1/2004 | Mao et al. | 363/127 |
| 7,006,364 B2 | * | 2/2006 | Jin et al. | 363/21.01 |
| 7,196,920 B2 | * | 3/2007 | Quitayen | 363/127 |

* cited by examiner

*Primary Examiner* — Harry Behm
*Assistant Examiner* — Matthew Grubb
(74) *Attorney, Agent, or Firm* — Farjami & Farjami LLP

(57) ABSTRACT

A flyback converter circuit in accordance with an embodiment of the present application includes a DC input operable to receive a DC voltage from a DC voltage source, a transformer including a primary coil and a secondary coil, a primary switch operable to selectively connect the primary coil to the DC input, a controller operable to provide a control signal to turn the primary switch ON and OFF, wherein the primary coil is connected to the DC input when the primary switch is ON, a delay device operable to delay an ON pulse of the control signal provided to the primary switch such that the primary switch is turned on after a delay of a predetermined period of time and a secondary switch connected in series with a capacitor and controlled by the control signal from the controller, wherein the secondary switch and the capacitor are connected in parallel with the primary switch. The control signal from the controller turns the secondary switch ON during the delay, such that a transient is induced in the primary coil before the primary switch is turned ON.

20 Claims, 5 Drawing Sheets

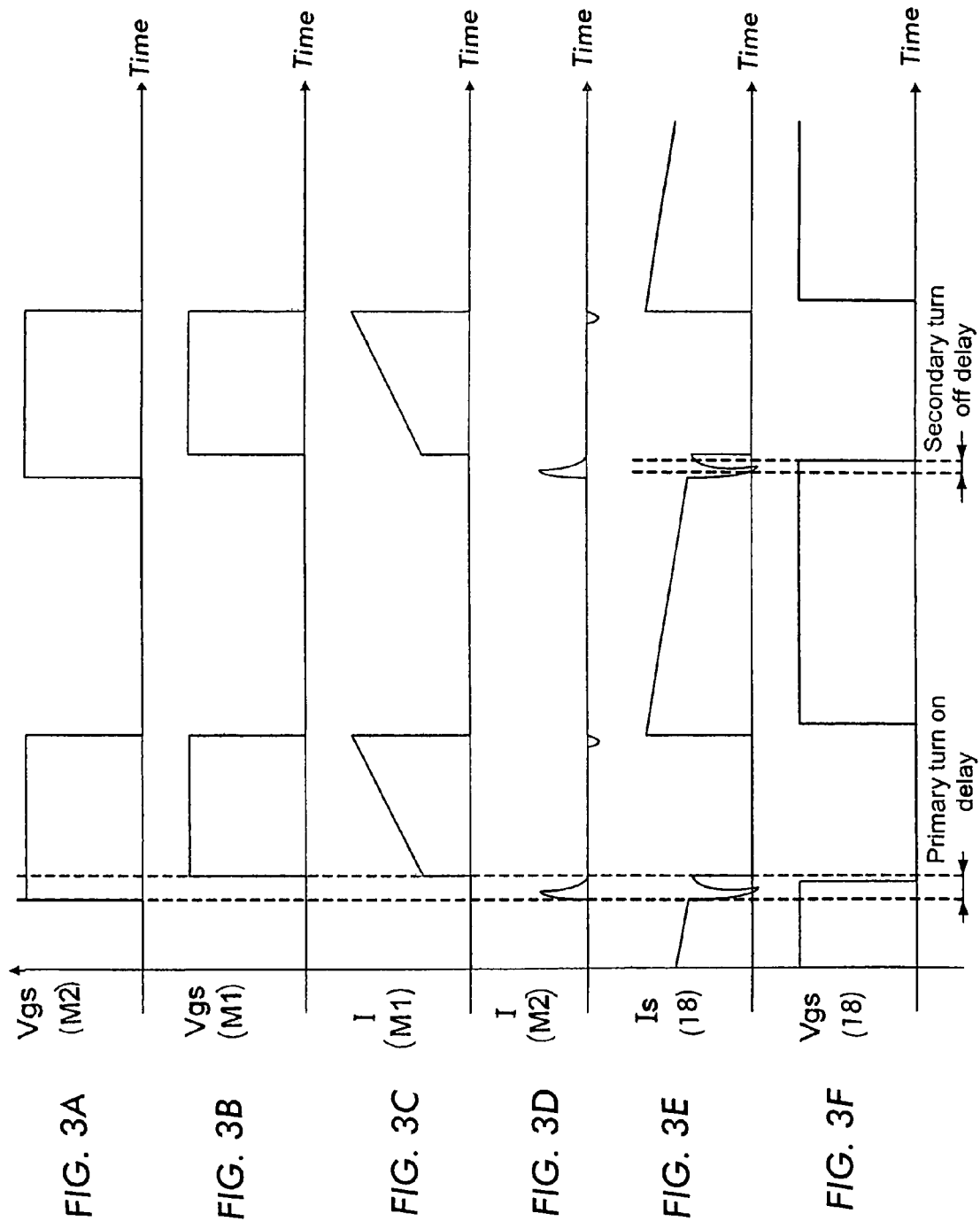

FLYBACK CONVERTER WITH IMPROVED SYNCHRONOUS RECTIFICATION

CROSS REFERENCE TO RELATED APPLICATIONS

The present application claims benefit of and priority to Provisional Patent Application No. 60/809,319 entitled SECONDARY SIDE SYNCHRONOUS RECTIFICATION CONTROL SYNCHRONIZATION THROUGH PRIMARY SIDE RLC COUPLING IN CCM FLYBACK CONVERTERS filed May 30, 2006, the entire contents of which are hereby incorporate by reference herein.

BACKGROUND OF THE INVENTION

The present invention relates to a flyback converter with improved synchronous rectification. In particular, the present invention relates to a flyback converter including a delay circuit on a primary side of the converter that imposes a transient in advance of the regular primary switching pulse to trigger shut down of the rectifier switch on the secondary side of the converter and improve synchronous rectification.

It has become common to incorporate synchronous rectification control in flyback converters that makes use of voltage and current sensing across the rectifier MOSFET. One non-limiting example of such a control circuit is assignee International Rectifier Corporation's IR1167 SmartRectifier control IC.

Such control circuits generally perform quite well in Discontinuous Current Mode (DCM) and Critical Conduction Mode (CrCM) devices, or converters, however, there are some problems when these control circuits are utilized in Continuous Current Mode (CCM) devices. Specifically, the voltage sensing technique used by such circuits typically does not ensure efficient synchronous rectification turn OFF in CCM devices. This is primarily due to the fast transients that results when the primary power transistor is hard switched into the ON position. Specifically, the fast transients do no allow the rectifier switch to turn off quickly enough. This results in rather significant and undesirable reverse currents running through the rectifier switch.

Accordingly, it would be beneficial to provide a flyback converter with synchronous rectification that avoids the problems noted above.

SUMMARY OF THE INVENTION

It is an object of the present invention to provide a flyback converter with improved synchronous rectification.

A flyback converter circuit in accordance with an embodiment of the present application includes a DC input operable to receive a DC voltage from a DC voltage source, a transformer including a primary coil and a secondary coil, a primary switch operable to selectively connect the primary coil to the DC input, a controller operable to provide a control signal to turn the primary switch ON and OFF, wherein the primary coil is connected to the DC input when the primary switch is ON, a delay device operable to delay an ON pulse of the control signal provided to the primary switch such that the primary switch is turned on after a delay of a predetermined period of time and a secondary switch connected in series with a capacitor and controlled by the control signal from the controller, wherein the secondary switch and the capacitor are connected in parallel with the primary switch. The control signal from the controller turns the secondary switch ON during the delay, such that a transient is induced in the primary coil before the primary switch is turned ON.

A method of providing improved synchronous rectification in a flyback converter in accordance with an embodiment of the present application includes connecting a primary coil of a transformer to a primary switch such that the primary coil is selectively connected to a DC voltage, generating a control signal to turn the primary switch ON and OFF, providing the control signal to a delay device such that an ON pulse of the control signal is delayed a predetermined period of time, providing the control signal with the delayed ON pulse to the primary switch, wherein the primary coil is connected to the DC voltage when the primary switch is ON, connecting a secondary switch in series with a capacitor such that the secondary switch and the capacitor are connected in parallel with the primary switch, providing the control signal from the controller to the secondary switch, wherein the control signal is provided to the secondary controller without the delayed ON pulse, such that the secondary switch turns ON prior to the primary switch resulting in a transient in the primary coil before the primary switch is turned ON and turning OFF a rectification switch connected to a secondary coil of the transformer when the transient on the primary coil is transferred to the secondary coil via the transformer, such that the rectification switch is completely OFF when the primary switch is turned ON.

Other features and advantages of the present invention will become apparent from the following description of the invention which refers to the accompanying drawings.

BRIEF DESCRIPTION OF THE DRAWING(S)

FIG. 3A is an ideal waveform of the gate source voltage of the secondary switch of the flyback converter of FIG. 1;

FIG. 3B is an ideal waveform of the gate source voltage of the primary switch of the flyback converter of FIG. 1;

FIG. 3C is an ideal waveform of the current through the primary switch of the flyback converter of FIG. 1;

FIG. 3D is an ideal waveform of the current through the secondary switch of the flyback converter of FIG. 1;

FIG. 3E is an ideal waveform of the current in the rectification switch of the flyback converter of FIG. 1;

FIG. 3F is a, ideal waveform of the gate source voltage in the rectification switch of the flyback converter of FIG. 1.

DETAILED DESCRIPTION OF PREFERRED EMBODIMENTS OF THE INVENTION

Figure 1:
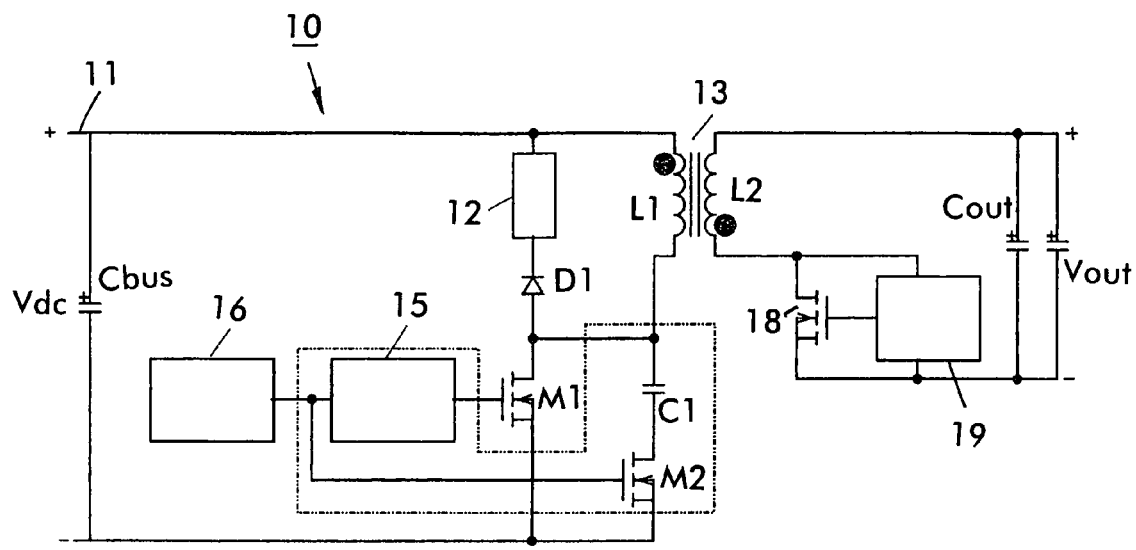
FIG. 1 is a block diagram of a flyback converter in accordance with an embodiment of the present application.

FIG. 1 is an illustration of a flyback converter 10 in accordance with an embodiment of the present invention. The converter 10 includes a DC bus capacitor Cbus across which a DC voltage (Vdc) for the DC bus may be provided. The Vdc is commonly provided from an AC line voltage via a rectifier, however, the input DC bus voltage may be provided in any suitable manner. The converter 10 may simply include a DC input 11, for example, that receives the DC voltage (Vdc) from an external DC voltage source, if desired. A snubber circuit 12 may be connected in series with a free wheeling diode D1 and a primary switch, implemented in this embodiment by MOSFET M1, across the DC bus. It is noted that while a snubber circuit such as snubber circuit 12 is preferably included in the converter 10, it is not necessary. The MOSFET M1 is switched ON and OFF in order to adjust the output voltage (Vout) provided across output capacitor Cout. Specifically, the switch M1 is turned ON and OFF such that the primary coil L1 is connected and disconnected from the DC voltage Vdc. The voltage in the primary inductor coil L1 induces a voltage in the secondary inductor coil L2 of the transformer 13. This secondary voltage is used to provide the output voltage Vout across the output capacitor (Cout) in a known manner. A rectifier switch 18, preferably embodied as a MOSFET, as illustrated in FIG. 1, is provide on the secondary side of the converter 10 to provide for secondary side synchronous rectification in a known manner. The ON/OFF state of the rectifier switch 18 is controlled by a rectification control signal provided by the synchronous rectification (SR) controller 19.

The converter 10 of FIG. 1 is similar to a conventional flyback converter except that it includes, among other things, the elements that are highlighted by the dashed lines in FIG. 1. Specifically, in accordance with an embodiment of the present application, a delay device 15 is provided between the controller 16 and the primary switch M1. The delay device 15 is operable to introduce a delay to the ON pulse of a control signal provided by the controller 16 to the primary switch M1. In addition, a secondary switch M2 is provided in series with a capacitor C1, with both the switch M2 and the capacitor C1 in parallel with the primary switch M1. The switch M2 is controlled by the same control signal provided by the controller 16, however, it is connected to the controller 16 at a point prior to the delay device 15. Thus, the ON pulse of the control signal that is provided form controller 16 to the switch M2 is not delayed. As a result the switch M2 turns ON before the primary switch M1.

In operation, a transient is imposed on the primary side inductor L1 of the coupled inductor transformer 13 when the switch M2 turns ON. However, due the delay imposed by the delay device 15, the transient occurs prior to the turning ON of the primary switch M1. The transient in the primary coil L1 is transferred to the secondary coil L2 via the transformer 13. The transient is interpreted by the synchronous rectifier (SR) controller 19 as a turn OFF trigger for the rectifier switch 18. Specifically, the transient results in a change in voltage or current across the rectifier switch 18 which triggers a rectifier control signal provided from the SR controller 19 to the rectifier switch 18 to shut OFF the rectifier switch 18. Since the transient in the primary coil M1 triggers the turning OFF of the rectifier switch 18, there is sufficient time for the rectifier switch 18 to turn completely OFF before the primary switch M1 turns ON. As a result, the large reverse current that commonly occurs in conventional rectification switches due to the delayed turn OFF of the rectifier switch is reduced to the minimum current for charging the MOSFET output capacitance up to its reverse voltage. Thus, synchronous rectification in the converter 10 is greatly improved. This is particularly important in CCM flyback converters, which as noted above, typically have poor synchronous rectification characteristics.

Figure 2:
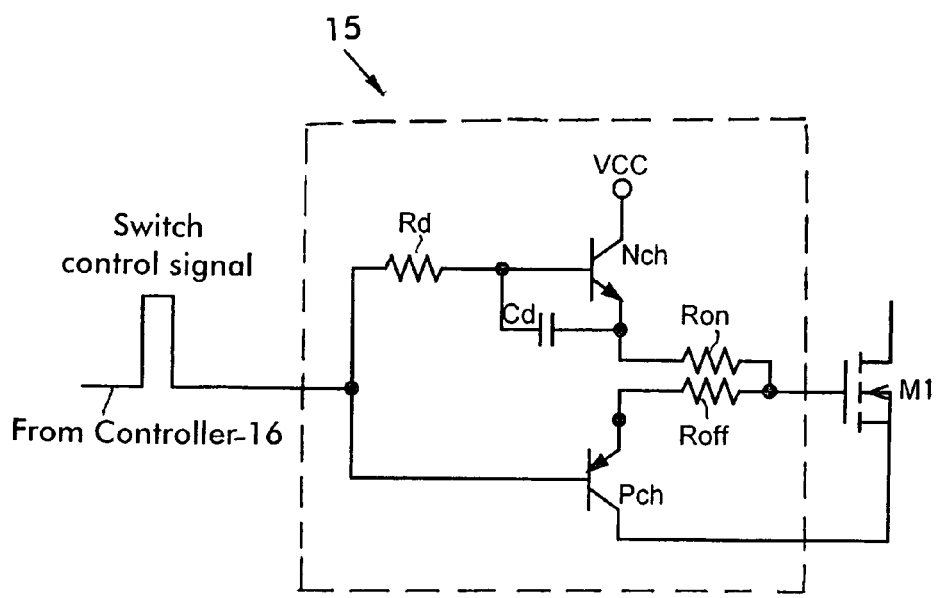
FIG. 2 is an exemplary illustration of a delay device of the flyback converter of FIG. 1 in accordance with an embodiment of the present application.

FIG. 2 illustrates an exemplary embodiment of the delay device 15 of FIG. 1, for example. While FIG. 2 illustrates a particular embodiment of the delay device 15, it is noted that the delay device 15 may be implemented in any other appropriate manner. In particular, in FIG. 2 the control signal from the controller 16 is provided to the delay device 15. Only the ON pulse in the control signal from controller 16 is delayed by the device 15. In the embodiment of FIG. 2, this is accomplished using a simple RC cell connected on an upper buffer driver of a bipolar complementary stage circuit. Specifically, in FIG. 2, this RC cell is embodied by the resistor Rd and the capacitor Cd. As a result, an ON pulse is provided to the gate of the primary switch M1 across resistor Ron with a delay based on the RC cell formed by Rd and Cd. The values of Rd and Cd may be selected or adjusted in order to establish the appropriate or desired delay time. In contrast, there is no delay when the control signal is used to turn the switch M1 OFF. Alternatively, a digital counter, or any other appropriate component, may be used in place of the RC cell to delay the ON pulse.

FIGS. 3A-F illustrate ideal waveforms for the primary and secondary switches M1, M2 and the rectifier switch 18 of FIG. 1. FIG. 3A illustrates the ideal waveform for the gate-source voltage (Vgs) of the switch M2. As illustrated, the Vgs of the switch M2 rises, preferably upon receiving the ON pulse from the controller 16. As a result, the switch M2 turns ON and current begins to flow through M2 (see FIG. 3D). A transient is triggered in the primary coil L1 which is conveyed to the secondary coil L2 in the transformer 13. Current drops in the rectifier switch 18, as is illustrated in FIG. 3E. The transient in the primary coil results in the controller 19 turning the rectifier switch 18 OFF. The delay that is introduced by the delay circuit 15 allows the rectifier switch 18 to turn completely OFF before the end of the delay period, as can be seen in FIG. 3F. Thus, the rectifier switch 18 is completely OFF before the switch M1 turns ON, that is, before the ON pulse is provided to the gate of the switch M1 as illustrated in FIG. 3B. Since the rectifier switch 18 is completely OFF before the main switch M1 goes ON, inefficient reverse currents are minimized.

Since the delay imposed by the delay device 15 only affects the ON pulse of the control signal from the controller 16, there is no delay between the shut OFF of the switches M1 and M2 as can be seen by comparing the waveforms of FIGS. 3A and 3B, for example.

In addition, as is noted above, and as can be seen in FIG. 3A, there is no delay in the ON pulse provided to the gate of the switch M2. Thus, the switch M2 goes ON and the transient is induced via the RLC circuit formed by the switch M2, the capacitor C1 and the primary coil L1. Since there is no delay introduced to the ON signal provided to the switch M2, this switch is activated before the primary switch M1. The resulting transient triggers the rectifier switch 18 to be shut OFF in advance of the turning on of the main switch M1. As a result, any reverse current through the rectifier switch 18 is minimized.

Figure 4A:
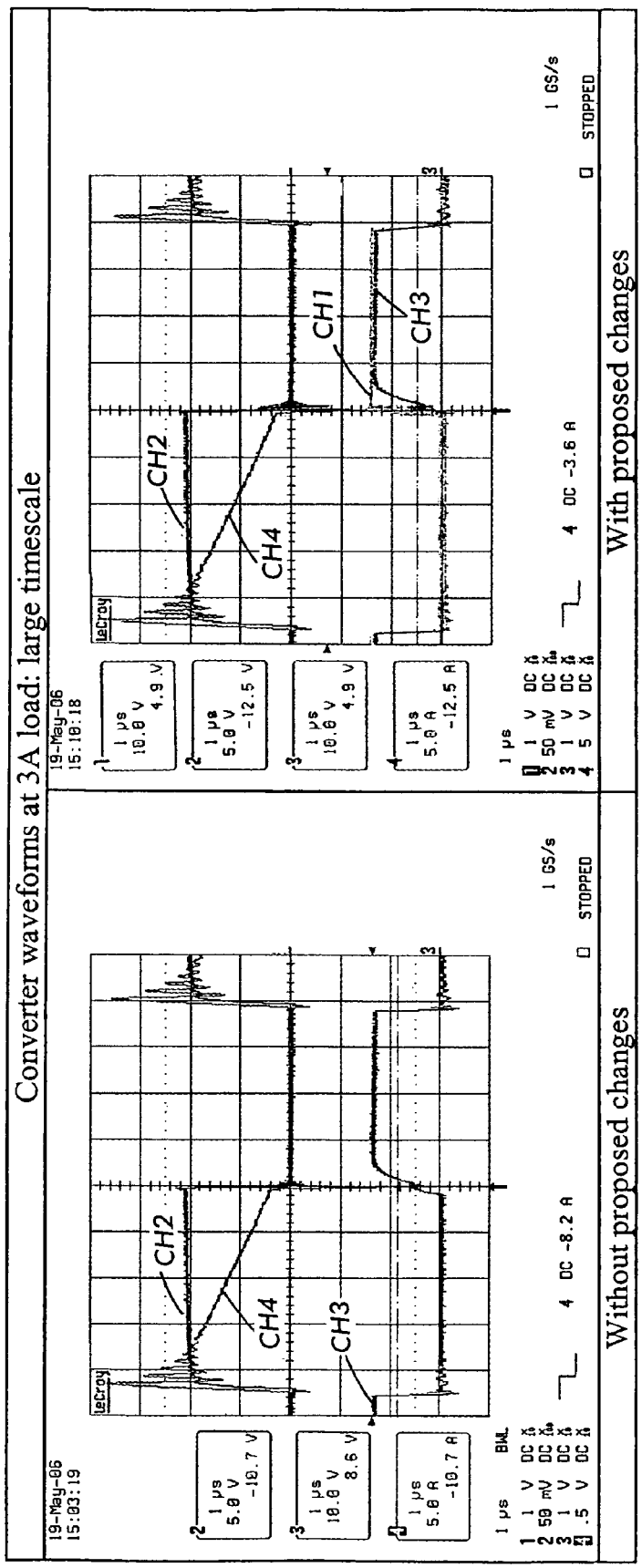
FIGS. 4A-4C illustrate measured values collected by simulating the circuit of the flyback converter of FIG. 1.
Figure 4B:
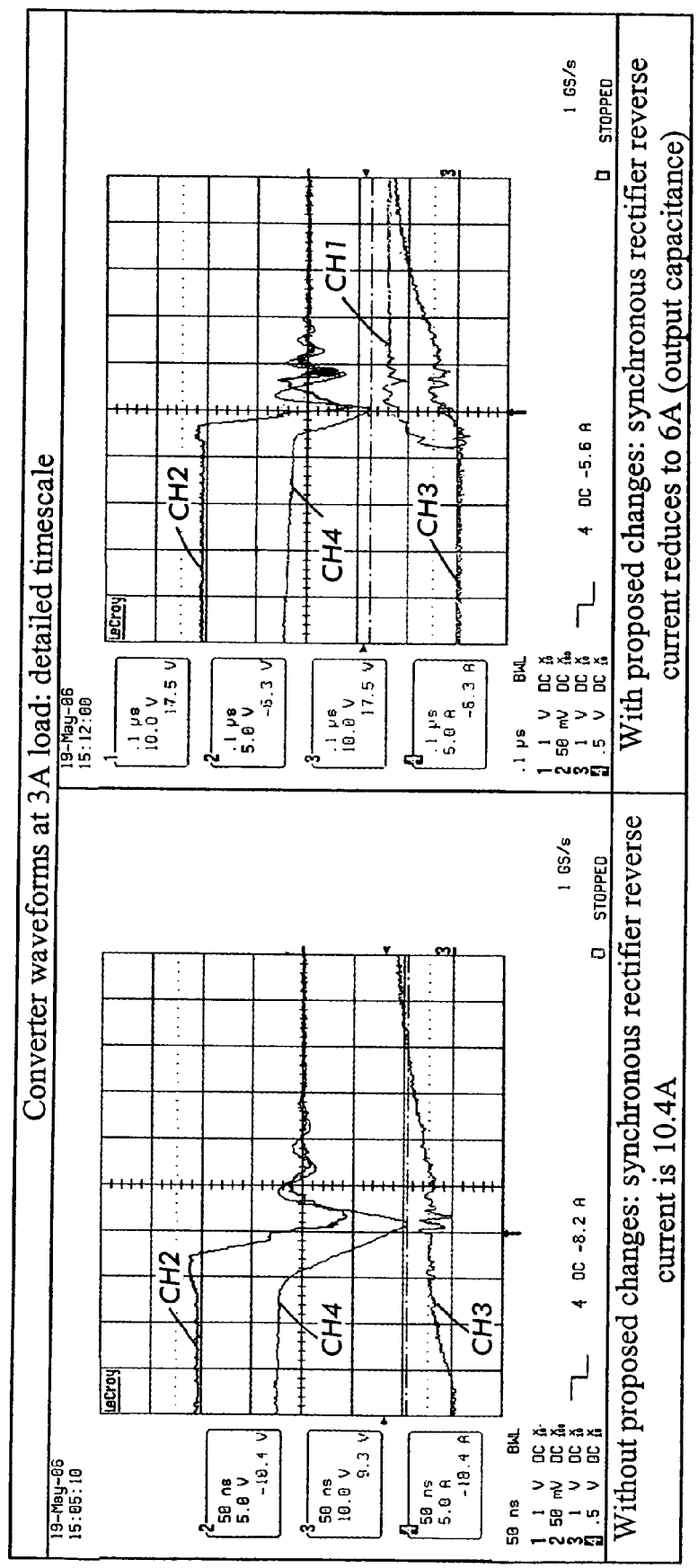
Figure 4C:
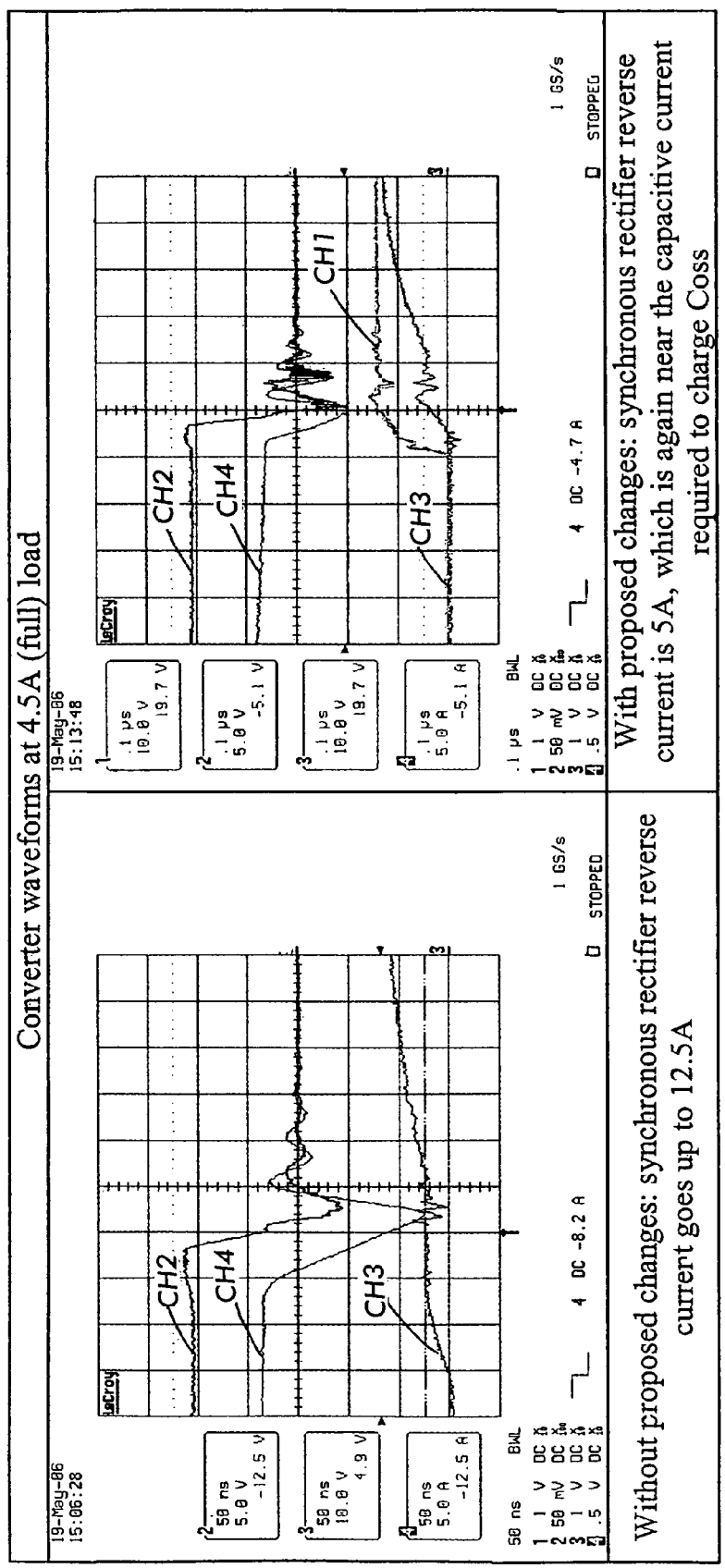

In each of the FIGS. 4A-4C, the left side illustrates performance of a converter that does not include the features described above. The right side of each of the FIGS. 4A-4C illustrates the performance of a converter in accordance with the present invention. Specifically, the data in FIGS. 4A-4C was gathered by measuring performance of a circuit used to simulate that of FIG. 1. In particular, a commercial 72 W power supply was modified to include synchronous rectification (based on the IR1167 control IC) and the modifications described above. In this manner, the performance of the circuit of FIG. 1 could be tested.

In each of the FIGS. 4A-4C, Channel 1 (CH1) designates a measurement of the gate source voltage (Vgs) of the secondary switch M2, channel 2 (CH2) designates the gate source voltage (Vgs) of the rectifier switch 18, channel 3 (CH3) indicates the gate source voltage (Vgs) of the main switch M1 and channel 4 (CH4) indicates the current through the rectifier switch 18. As can be seen in each of the FIGS. 4A-4C, when the improvements described above are utilized, the reverse current is substantially reduced as a result of the earlier shutting OFF of the rectifier switch. It is noted that the results illustrated in FIGS. 4A-4C were measured in a simulated test circuit and thus have not been optimized. Such optimization would likely lead to even more improved results.

Accordingly, the flyback converter of the present invention provides improved synchronous rectification by triggering the shut off of the rectifier switch on the secondary side of the converter prior to the turning ON of the primary switch on the primary side of the converter. This results in lower reverse current in the rectifier switch.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A flyback converter circuit including synchronous rectification comprising:
    a DC input operable to receive a DC voltage from a DC voltage source;
    a transformer including a primary coil and a secondary coil;
    a primary switch operable to selectively connect the primary coil to the DC input;
    a controller operable to provide a control signal to turn the primary switch ON and OFF, wherein the primary coil is connected to the DC input when the primary switch is ON;
    a delay device operable to delay an ON pulse of the control signal provided to the primary switch such that the primary switch is turned on after a delay of a predetermined period of time; and
    a series combination comprising a secondary switch connected in series with a capacitor, the series combination connected in parallel with the primary switch, the secondary switch controlled by the control signal from the controller;
    wherein the control signal from the controller turns the secondary switch ON during the delay, such that a transient is induced in the primary coil before the primary switch is turned ON.

2. The flyback converter circuit of claim 1 further comprising:
    a rectification switch operable to provide synchronous rectification and connected to the secondary coil of the transformer; and
    a rectification controller operable to provide a rectification control signal to the rectification switch to turn the rectification switch ON and OFF, wherein the transient induced in the primary coil is transferred to the secondary coil and triggers the rectification controller to turn the rectification switch OFF such that the rectification switch is completely OFF when the primary switch turns ON.

3. The flyback converter circuit of claim 2, wherein the rectification control signal is generated based on at least one of a measured voltage and current across the rectification switch.

4. The flyback converter circuit of claim 3, wherein the delay device further comprises at least one of an RC cell and a digital counter that receives the control signal from the controller, and delays only an ON pulse in the control signal for a predetermined period of time.

5. The flyback converter of claim 4, wherein the control signal from the controller is provided to the secondary switch directly, without passing through the delay device.

6. The flyback converter circuit of claim 1 further comprising a rectification switch, wherein the transient induced in the primary coil is transferred to the secondary coil and triggers the rectification switch OFF such that the rectification switch is completely OFF when the primary switch turns ON.

7. The flyback converter circuit of claim 6, wherein the rectification switch is operable to provide synchronous rectification in the flyback converter circuit.

8. A method of providing improved synchronous rectification in a flyback converter comprising:
    connecting a primary coil of a transformer to a primary switch such that the primary coil is selectively connected to a DC voltage;
    generating a control signal to turn the primary switch ON and OFF, providing the control signal to a delay device such that an ON pulse of the control signal is delayed a predetermined period of time;
    providing the control signal with the delayed ON pulse to the primary switch, wherein the primary coil is connected to the DC voltage when the primary switch is ON;
    connecting a secondary switch in series with a capacitor such that the secondary switch and the capacitor are connected in parallel with the primary switch, providing the control signal from a controller to the secondary switch, wherein the control signal is provided to the secondary controller without the delayed ON pulse, such that the secondary switch turns ON prior to the primary switch resulting in a transient in the primary coil before the primary switch is turned ON; and
    turning OFF a rectification switch connected to a secondary coil of the transformer when the transient on the primary coil is transferred to the secondary coil via the transformer, such that the rectification switch is completely OFF when the primary switch is turned ON.

9. The method of claim 8 wherein the step of turning OFF the rectification switch further comprises:
    generating a rectification control signal in a rectification controller based on at least one of a measured voltage and current across the rectification switch, wherein the rectification control signal turns the rectification switch OFF when the transient on the primary coil is transferred to the secondary coil of the transformer resulting in a change of at least one of the voltage and current across the rectification switch.

10. The method claim 9, wherein the rectification switch is turned completely OFF before the primary switch is turned ON.

11. A flyback converter circuit comprising:
    a delay device configured to provide a control signal to turn ON a primary switch after a delay, said delay preventing said primary switch from connecting a primary coil of a transformer to an input voltage for a period of time;
    a secondary switch configured to receive said control signal to turn ON during said period of time, said secondary switch operable to provide a voltage on said primary coil responsive to receiving said control signal, thereby inducing said voltage on a secondary coil of said transformer, said voltage to trigger turn OFF of a rectification switch connected to said secondary coil during said period of time.

12. The flyback converter circuit of claim 11, wherein said secondary switch is operable to provide said voltage to said primary coil by turning ON, thereby inducing a transient in said primary coil.

13. The flyback converter circuit of claim 11, wherein said secondary switch is connected in series with a capacitor such that said secondary switch and said capacitor are connected in parallel with said primary switch.

14. The flyback converter circuit of claim 11, wherein said rectification switch is turned OFF using a rectification controller, said rectification controller operable to provide a rectification control signal to the rectification switch to turn the rectification switch ON and OFF.

15. The flyback converter circuit of claim 14, wherein said rectification control signal is generated based on at least one of a measured voltage and current across said rectification switch.

16. The flyback converter circuit of claim 11, wherein said rectification switch is operable to provide synchronous rectification in said flyback converter circuit.

17. The flyback converter circuit of claim 11, wherein said delay device comprises at least one of an RC cell and a digital counter that receives said control signal from a controller, and delays only an ON pulse in said control signal for a predetermined period of time.

18. The flyback converter of claim 11, wherein said control signal is provided to said secondary switch directly, without passing through said delay device.

19. The flyback converter of claim 11, wherein said flyback converter comprises a continuous current mode flyback converter.

20. The flyback converter of claim 11, further comprising a snubber circuit connected in series with a free wheeling diode and said primary switch.

* * * * *